US008159177B2

(12) United States Patent
Zhou

(10) Patent No.: US 8,159,177 B2
(45) Date of Patent: Apr. 17, 2012

(54) SYSTEM FOR REALIZING ROTOR VARIABLE FREQUENCY SPEED CONTROL ASYNCHRONOUSLY AND SIMULTANEOUSLY BY DRIVING MULTIPLE MOTORS VIA ONE INVERTER

(76) Inventor: Shunxin Zhou, Wuhan (CN)

( * ) Notice: Subject to any disclaimer, the term of this patent is extended or adjusted under 35 U.S.C. 154(b) by 642 days.

(21) Appl. No.: 12/274,250

(22) Filed: Nov. 19, 2008

(65) Prior Publication Data

US 2010/0033123 A1 Feb. 11, 2010

(30) Foreign Application Priority Data

Aug. 8, 2008 (CN) .......................... 2008 1 0048732

(51) Int. Cl.
*H02P 1/56* (2006.01)
(52) U.S. Cl. ......... 318/807; 318/800; 318/801; 318/803
(58) Field of Classification Search .................. 318/807, 318/800, 801, 803
See application file for complete search history.

(56) References Cited

U.S. PATENT DOCUMENTS 5,142,468 A * 8/1992 Nerem ............................. 363/71
7,193,826 B2 * 3/2007 Crane et al. ...................... 361/23

FOREIGN PATENT DOCUMENTS

| CN | 00232436.9 | 11/2000 |
| CN | 01212247.5 | 1/2001 |
| CN | 200720087085.7 | 9/2007 |
| CN | 200810094147.6 | 5/2008 |
| CN | 200810048252.6 | 7/2008 |

* cited by examiner

*Primary Examiner* — Walter Benson
*Assistant Examiner* — David Luo
(74) *Attorney, Agent, or Firm* — Knobbe, Martens, Olson & Bear LLP

(57) ABSTRACT

A system for realizing rotor variable frequency speed control asynchronously and simultaneously is disclosed. Multiple motors are driven via one inverter, which consists of a motor group, a rectifier group, a chopper group, an isolator group, an amperite group, a power capacitor group, a full-bridge or a half-bridge, a speed feedback voltage detector group, and a current feedback voltage detector group. Using inversion control theory, the voltage outputs by a full or half-bridge inverter are an inverse electromotive force of each functional motor, and each motor operates asynchronously and simultaneously. This system may be used in crane operations. As a crane rises, redundant electricity is fed back to the motor via an inverter; and as the crane lowers, the motor will generate electricity, and the electricity is fed back to the motor via the inverter.

8 Claims, 3 Drawing Sheets

SYSTEM FOR REALIZING ROTOR VARIABLE FREQUENCY SPEED CONTROL ASYNCHRONOUSLY AND SIMULTANEOUSLY BY DRIVING MULTIPLE MOTORS VIA ONE INVERTER

BACKGROUND OF THE INVENTION

1. Field of the Invention

This application relates to a motor rotor variable frequency speed control system, and in particular, to a system for realizing rotor variable frequency speed control asynchronously and simultaneously by driving multiple motors via one inverter.

2. Description of the Related Art

Motor is the prime mover in each operating mechanism of a crane, blower fan and water pump. It converts electric energy into mechanical energy. Taking crane as an example, motors can drive a crane to perform various different mechanism movements such as lifting (or falling), luffing, revolving and walking, thereby accomplishing the field operation task of the crane.

FIG. 1 is a schematic diagram showing a traditional crane to realize variable frequency speed control using motors of different jobs. It can be seen from the figure that, the system converts the constant voltage constant frequency AC power supply provided by an electric network into DC power supply via a rectifier bridge, and then converts the DC power supply, by an intermediate circuit, into AC power supply of different working frequencies via an inverter bridge, so as to drive the motor to rotate.

It is supposed that: the frequency of the electric network power supply is $f_o$, and the working frequency of the motor is $f_m$, Then, $f_m = \S f_o$ is true, Here, § is slip ratio.

During the field operation of a crane, it generally accomplishes four different operations, lifting, luffing, revolving and walking. Therefore, each corresponding actuating mechanism needs a different motor to provide different electric energy that will be converted to a different mechanical energy. In other words, during different operations of the crane, the motor rotating speed needed is different, that is, the working frequency $f_m$ of the motor is different. However, in the traditional motor variable frequency speed control system, one inverter bridge can only convert the working frequency of one motor and carry out variable frequency speed control on one motor, which is so called "one-driving-one" technology. Apparently, for the four different operations of the crane, four inverter circuits are required to realize "AC-DC-AC" conversion during which transduction is performed twice. Thus, the respective working frequency needed by multiple motors will be generated, so that the lifting, luffing, revolving and walking operation during the field operation of the crane will be accomplished respectively.

In conclusion, for the above traditional motor speed control system, its frequency adjustment range is broad, and it will not be limited by the frequency of the electric network; not only the forced transduction, but also the load transduction, may be employed. For such a speed control system, except that the loss of slipping function is great and the efficiency is low at low speed, most prominently, four inverters are generally used, thus the system will be bulky, massy and costly, and it will be very difficult to implement.

In recent years, with the rapid development of frequency conversion technologies, especially with the application of vector control technologies and direct torque control technology, frequency conversion technology becomes increasingly mature, and it takes the leading position in AC transmission due to its broad speed control range, high steady speed precision, rapid dynamic response and its capability of reversible operation in the four quadrants of the rectangular axis. Its speed control capability can completely match that of DC transmission, and there appears a tendency that DC transmission is being replaced by it. However, in the frequency conversion technologies employed by overseas jack mechanisms, it still uses one frequency converter for one function, and one inverter bridge is equipped for one frequency converter; for the four functions during the normal operation of a crane, four inverter bridges are still needed. If energy feedback function is to be added to the variable frequency speed control system, another four inverter bridges need to be added, which is nonpaying apparently. Therefore, for the related products of many overseas companies, "one-driving-one" mode is still employed to accomplish the normal operation of a crane, for example, the products such as YASKAWA (Japan), Siemens (Germany), ABB (Switzerland) and Schneider (France), which can be seen everywhere in related application field in China, and of which the prices are very high.

Directed to the serious faults of the above existing frequency conversion technologies, studies have been made by the inventor on how to drive four motors via one inverter so as to realize rotor variable frequency speed control via the turnon and turnoff of each chopper and make a crane to accomplish four works such as lifting, luffing, revolving and walking in real time when the inverter is positioned at its minimum inverting angle during the operation of the crane. Patent applications have been filed successively by the inventor, and three utility model patents have been granted by State Intellectual Property Office of the People's Republic of China, with the Patent Number of "ZL002324369", "ZL01212245" and "ZL2007200870857" respectively. At the same time, two patents for invention, with the application number of "2008100941476" and "2008100482526", have been filed this year. However, problems, such as how to provide appropriate forward and inverse output control voltage to effectively turn on and turn off each chopper, how to collect the rotor phase voltage and the rectifier output DC to rapidly establish a grid control electric field by the chopper so as to guarantee the normal and orderly work of the system, and how to make the system work reasonably according to the rated power of the motor, still need to be solved.

SUMMARY OF THE CERTAIN INVENTIVE ASPECTS

In a first aspect there is a system for realizing rotor variable frequency speed control asynchronously and simultaneously by driving multiple motors via one full-bridge inverter. That is, when on-line control is carried out on multiple motors, the voltage output by one and the same inverter is taken as an additional inverse electromotive force of each functional motor to drive each functional chopper to work in real time, thereby multiple motors may operate asynchronously and simultaneously.

In a second aspect there is a system for realizing rotor variable frequency speed control asynchronously and simultaneously by driving multiple motors via one half-bridge inverter. That is, when on-line control is carried out on multiple motors, the voltage output by one and the same inverter is taken as an additional inverse electromotive force of each functional motor to drive each functional chopper to work in real time, thereby multiple motors may operate asynchronously and simultaneously.

In a third aspect the system has an energy feedback and recycle function, so that the energy source may be saved effectively.

In a fourth aspect there is a motor rotor variable frequency speed control in which full bridge active inversion or half bridge active inversion is realized by one system.

Some embodiments of the invention employ the following technical solutions:

A system for realizing rotor variable frequency speed control asynchronously and simultaneously by driving multiple motors via one inverter, comprising:

a motor group, which comprises four motors, $M_1$, $M_2$, $M_3$ and $M_4$, for asynchronously and simultaneously accomplishing various jobs of a crane, such as lifting, luffing, revolving and walking;

a rectifier group, which comprises four rectifier bridges, $Z_1$, $Z_2$, $Z_3$ and $Z_4$, for rectifying AC signals with different frequencies provided by motor rotors connected therewith;

an amperite group, which comprises two amperites, $L_7$ and $L_8$, for providing an instantaneous current to make the system work normally;

a chopper group, which comprises four choppers, $IGBT_1$, $IGBT_2$, $IGBT_3$ and $IGBT_4$, for realizing the continuous adjustment of a DC current by adjusting the conductive rate of each chopper and thus continuously adjusting the motor rotor current, so as to attain the object of motor rotor variable frequency speed control; it should be noted that, when the conductive rate of the chopper is 100%, the motor rotating speed will be the rated rotating speed;

an isolator group, which comprises eight isolators, $D_1$, $D_2$, $D_3$, $D_4$, $D_5$, $D_6$, $D_7$ and $D_8$, for maintaining the continuity and guaranteeing the normal work of the system at minimum working current;

a full-bridge inverter or a half-bridge inverter, which, after rectifying the AC with different frequencies output by each motor rotor to DC, is adapted to invert the DC to a power supply with the same frequency and the same phase as the industrial AC power supply, realize the conversion of AC to DC and DC to AC, and feed back the energy to the motor or the electric network;

a current feedback voltage detector group, comprising four voltage detectors, $U_{I1}$, $U_{I2}$, $U_{I3}$ and $U_{I4}$, which is located in parallel with resistors through which the current feedback contained in the above rectifier bridge passes, for detecting each corresponding current feedback DC, converting it into voltage form and sending it to the input terminal of the corresponding signal processor; and a speed feedback voltage detector group, comprising four voltage detectors, $Uv_1$, $Uv_2$, $Uv_3$ and $Uv_4$, which is located between any two lines of the above motor rotor, for detecting the AC voltage with different frequencies between any two lines of each motor, and converting it into DC voltage and sending it to the input terminal of the corresponding signal processor.

In some embodiments, when online control is carried out on multiple motors using inversion control theory technology, according to the rated power of the motor, the voltage output by a full-bridge inverter or a half-bridge inverter is taken as an additional inverse electromotive force of each functional motor, and asynchronous and simultaneous operation of each motor is realized via the real-time work of the choppers of each functional motor, thereby the field operations of a crane, such as lifting, luffing, revolving and walking, can be realized.

In certain embodiments, during the rising operation of the crane, based on that the motor rotor is connected to an active inversion system, redundant electric energy is always fed back to the motor or the electric network via the inverter; but, during the falling operation of the crane, DC excitation is input to the two phase of the motor stator, thus the motor actually becomes a generator, and it is in power generating state, and moreover, the electric energy generated is again fed back to the motor or the electric network via the same inverter, so that energy recovery is realized, and energy source is saved effectively.

When a certain embodiment is applied in a high-power system, a full-bridge inverter will be used to drive multiple motors to realize rotor variable frequency speed control asynchronously and simultaneously; however, when the embodiment is applied in an intermediate-power system or a low-power system, a half-bridge inverter will be used to drive multiple motors to realize rotor variable frequency speed control asynchronously and simultaneously. For the conversion of its operating state, the phase voltage of each motor rotor collected, the rectifier DC and the main command voltage given by the motorman are comprehensively processed in real time by a microprocessor control center set externally under the control of its master program, so that the effective turnon and turnoff of each chopper may be controlled, and motor rotor variable frequency speed control may be realized. Automatic protection, state display and man-machine conversation may also be performed on overload limitation, failure monitoring, overspeed limitation, position restriction phase failure and undervoltage, overcurrent and wind velocity of the crane by adding an auxiliary circuit and in conjunction with appropriate software support, thus highly intellectualized and real-time control can be realized.

Certain embodiments of the invention, have such characteristics as simple circuit, small size, low cost, high reliability and energy saving.

DESCRIPTION OF SYMBOLS IN THE DRAWINGS

1: Motor Group: $M_1$, $M_2$, $M_3$ and $M_4$
2: Rectifier Group: $Z_1$, $Z_2$, $Z_3$ and $Z_4$
3: Chopper Group: $IGBT_1$, $IGBT_2$, $IGBT_3$ and $IGBT_4$
4: Isolator Group: $D_1$, $D_2$, $D_3$, $D_4$, $D_5$, $D_6$, $D_7$ and $D_8$
5: Amperite Group: $L_7$ and $L_8$
6: Power Capacitor Group: $C_{13}$, $C_{14}$, $C_{15}$ and $C_{16}$
7: Inverter: $KP_1$, $KP_2$, $KP_3$, $KP_4$, $KP_5$ and $KP_6$ are full-bridge inverter; $KP_1$, $KP_2$ and $KP_3$ are half-bridge inverter
8: Speed Feedback Voltage Detector Group: $U_{V1}$, $U_{V2}$, $U_{V3}$ and $U_{V4}$
9: Current Feedback Voltage Detector Group: $U_{I1}$, $U_{I2}$, $U_{I3}$ and $U_{I4}$

DETAILED DESCRIPTION OF THE EMBODIMENTS

Figure 1:
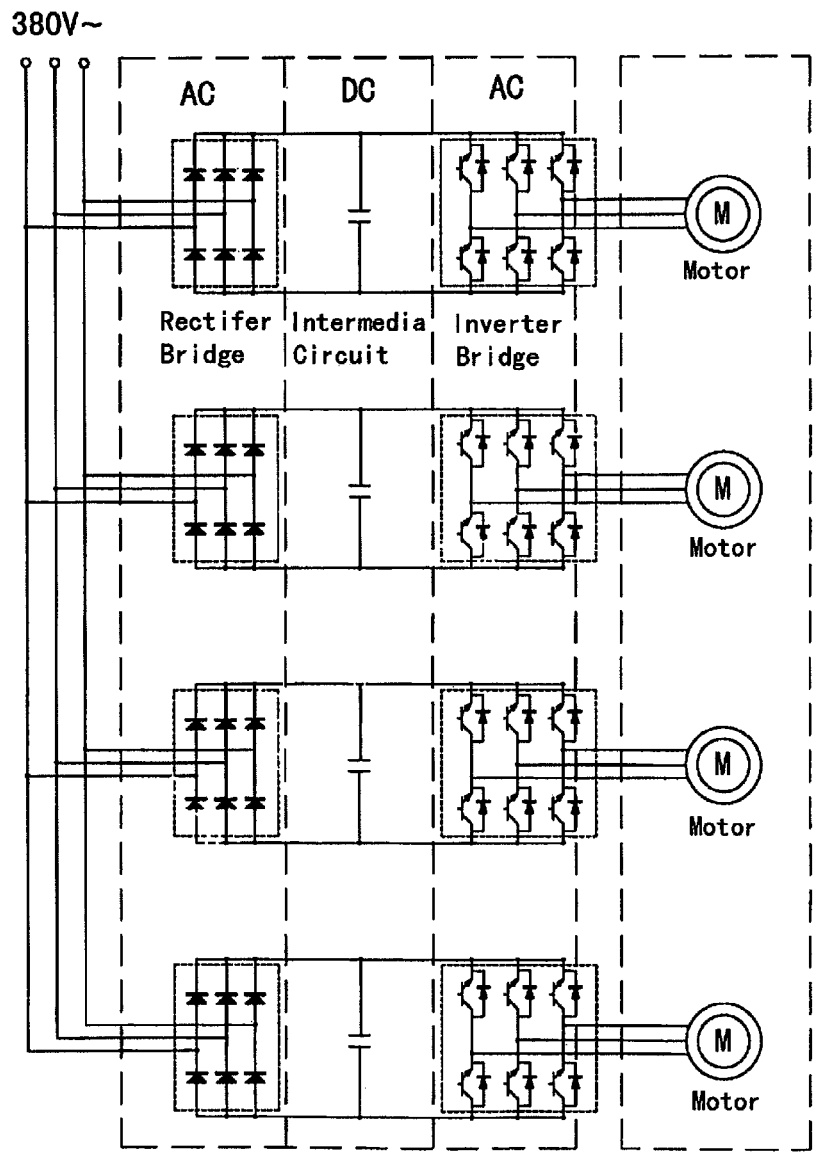
FIG. 1 is a schematic diagram showing a traditional system for a crane to realize variable frequency speed control using motors for different jobs.
Figure 2A:
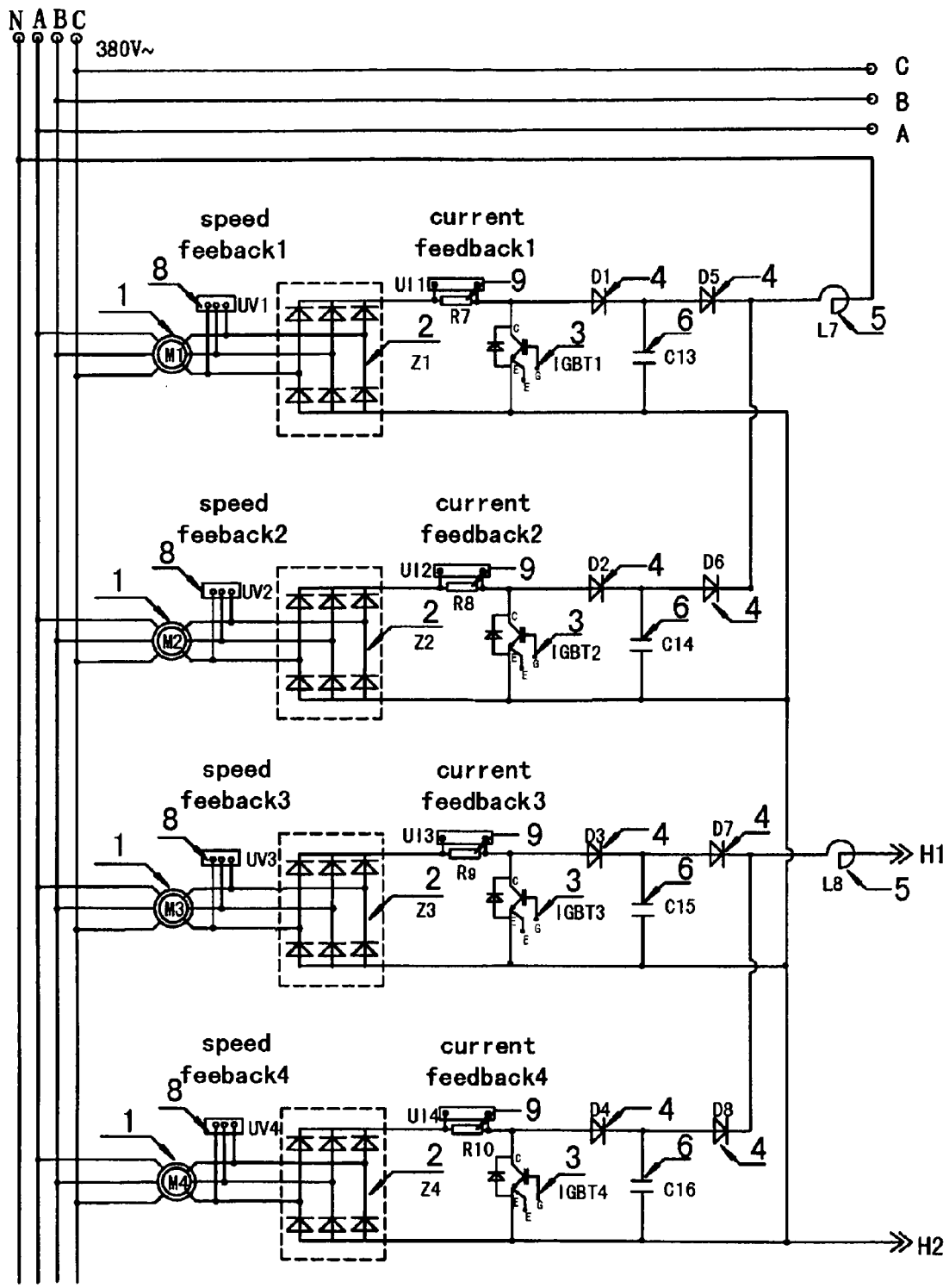
FIG. 2 is a schematic diagram showing the electrical principle of a system for realizing rotor variable frequency speed control asynchronously and simultaneously by driving multiple motors via a full-bridge inverter in the first embodiment of the invention and by driving multiple motors via a half-bridge inverter in the second embodiment of the invention.
Figure 2B:
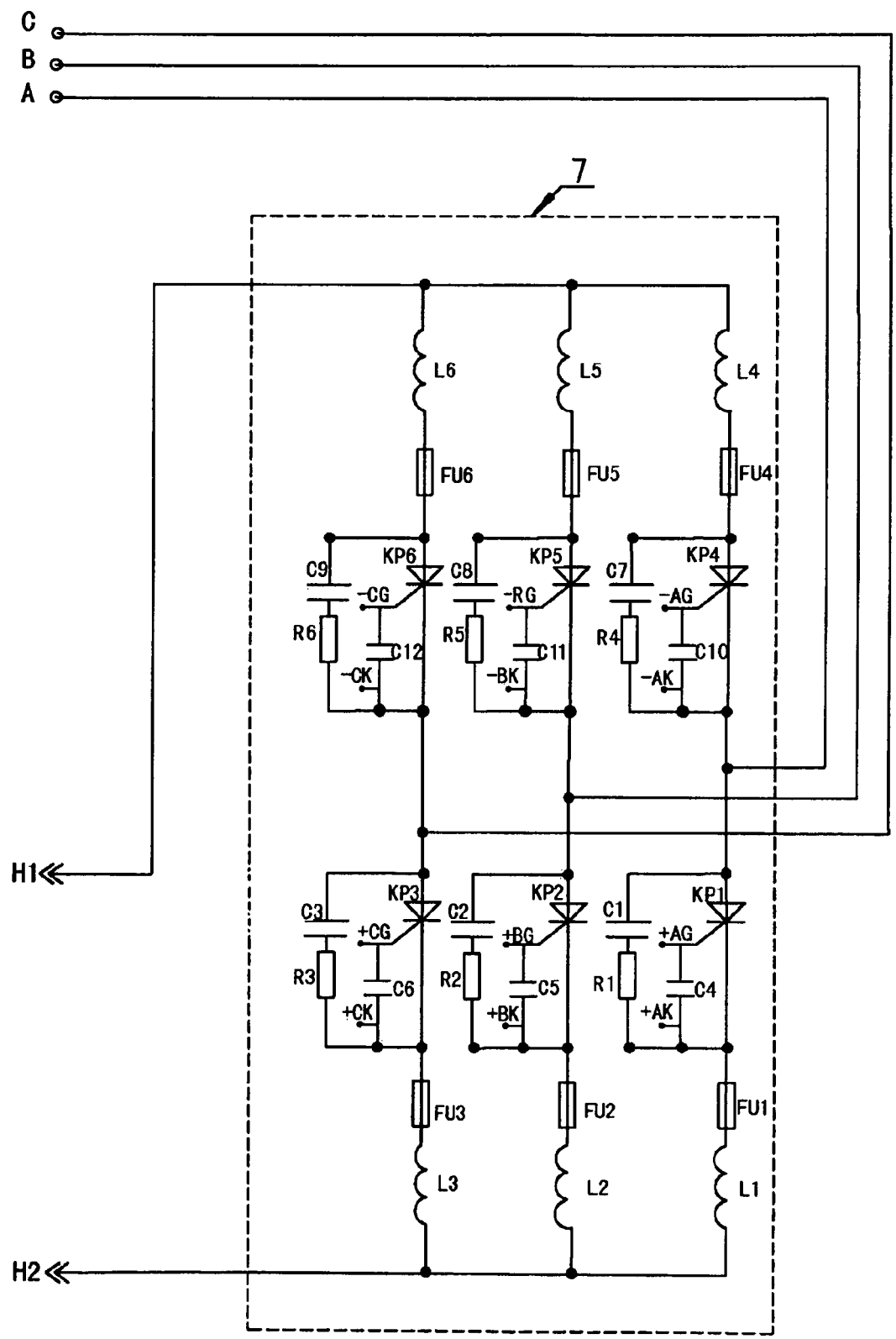

Referring to FIG. 2, it shows the first and the second preferred embodiment of the invention.

It can be seen from FIG. 2 that, the first embodiment of the invention consists, as a whole, of motor group 1, rectifier group 2, chopper group 3, isolator group 4, amperite group 5, power capacitor group 6, inverter 7, speed feedback voltage detector 8 and current feedback voltage detector 9, wherein:

the respective rotors of the four motors $M_1$, $M_2$, $M_3$ and $M_4$ in said motor group 1 are respectively connected to the respective corresponding input terminals of the four rectifiers $Z_1$, $Z_2$, $Z_3$ and $Z_4$ in rectifier group 2 in turn;

the respective cathodes E of four choppers $IGBT_1$, $IGBT_2$, $IGBT_3$ and $IGBT_4$ in said chopper group 3 respectively intersect the anodes of the respective corresponding three rectifier diodes of four rectifiers $Z_1$, $Z_2$, $Z_3$ and $Z_4$ in rectifier group 2 at one point, i.e., point D, in turn;

said inverter 7 is a full-bridge inverter, which comprises 6 silicon controlled invertors, i.e., $KP_1$, $KP_2$, $KP_3$, $KP_4$, $KP_5$ and $KP_6$, and three connection points of output terminals $KP_1$ and $KP_4$, $KP_2$ and $KP_5$, $KP_3$ and $KP_6$ are respectively connected to the ends A, B and C of a three-phase industrial AC power supply in turn, and then connected to the respective stators of four motors $M_1$, $M_2$, $M_3$ and $M_4$ in motor group 1.

said isolator group 4 comprises eight isolators, i.e., $D_1$, $D_2$, $D_3$, $D_4$, $D_5$, $D_6$, $D_7$ and $D_8$, wherein $D_1$ and $D_5$, $D_2$ and $D_6$, $D_3$ and $D_7$, $D_4$ and $D_8$ are respectively connected in series in turn;

wherein, the respective anodes of isolators $D_1$, $D_2$, $D_3$ and $D_4$ are respectively connected to the output terminals of the respective corresponding resistors $R_1$, $R_2$, $R_3$ and $R_4$ and the anodes C of choppers $IGBT_1$, $IGBT_2$, $IGBT_3$ and $IGBT_4$, in turn; and the cathodes of isolators $D_5$ and $D_6$ are simultaneously connected to the input terminal of current limiting inductor $L_7$ in amperite group 5, while the cathodes of isolator $D_7$ and $D_8$ are simultaneously connected to the input terminal of current limiting inductor $L_8$ in amperite group 5.

The connection points of isolators $D_1$ and $D_5$, $D_2$ and $D_6$, $D_3$ and $D_7$, $D_4$ and $D_8$ connected in series in said isolator group 4 are respectively connected to the respective one end of capacitors $C_{13}$, $C_{14}$, $C_{15}$ and $C_{16}$ in power capacitor group 6, in turn, and a T-shaped structure is formed.

Said power capacitor group 6 comprises four capacitors, i.e., $C_{13}$, $C_{14}$, $C_{15}$ and $C_{16}$, and the respective other end thereof simultaneously intersects the respective cathodes E of choppers $IGBT_1$, $IGBT_2$, $IGBT_3$ and $IGBT_4$ in chopper group 3 at one point, i.e., point D.

Said amperite group 5 comprises two current limiting inductors, i.e., $L_7$ and $L_8$, and the output terminal of current limiting inductor $L_7$ is connected to the zero line end N of the three-phase industrial AC power supply, while the output terminal of current limiting inductor $L_8$ is simultaneously connected to one end of inductors $L_4$, $L_5$ and $L_6$ in inverter 7 at one point.

It may also be seen from FIG. 2 that, the second embodiment of the invention consists, as a whole, of motor group 1, rectifier group 2, chopper group 3, isolator group 4, amperite group 5, power capacitor group 6, inverter 7, speed feedback voltage detector group 8 and current feedback voltage detector group 9, wherein:

the respective rotors of the four motors $M_1$, $M_2$, $M_3$ and $M_4$ in said motor group 1 are respectively connected to the respective corresponding input terminals of the four rectifiers $Z_1$, $Z_2$, $Z_3$ and $Z_4$ in rectifier group 2 in turn;

the respective cathodes E of four choppers $IGBT_1$, $IGBT_2$, $IGBT_3$ and $IGBT_4$ in said chopper group 3 respectively intersect the anodes of the respective corresponding three rectifier diodes of four rectifiers $Z_1$, $Z_2$, $Z_3$ and $Z_4$ in rectifier group 2 at one point, i.e., point D, in turn;

Said inverter 7 is a half-bridge inverter, which comprises three silicon controlled invertors, i.e., KP1, KP2 and KP3, and via a circuit formed by connecting three fuses FU1, FU2 and FU3 with three inductors L1, L2 and L3 in series and then via the respective other end of three inductors L1, L2 and L3, the respective cathodes thereof respectively intersect the respective cathodes E of four choppers $IGBT_1$, $IGBT_2$, $IGBT_3$ and $IGBT_4$ in chopper group 3 and the respective other end of four capacitors $C_{13}$, $C_{14}$, $C_{15}$ and $C_{16}$ in power capacitor group 6 at one point, i.e., point D, in turn.

Said inverter 7 is a half-bridge inverter, and the respective anodes of the three silicon controlled invertors $KP_1$, $KP_2$ and $KP_3$ thereof are respectively connected to the ends A, B and C of a three-phase industrial AC power supply in turn, and then connected to the respective stators of the four motors $M_1$, $M_2$, $M_3$ and $M_4$ in motor group 1.

The output terminal of current limiting inductor $L_7$ in said amperite group 5 is connected to the zero line end N of an industrial AC power supply, and a three-phase zero-type active inversion bridge structure is formed.

The above embodiments only illustrate the technical characteristics and implementability. It should be noted that, in addition to being used by a crane to perform multiple different mechanism movements such as lifting, luffing, revolving and walking so as to accomplish the field operation task, the invention may also be applicable for any place where multiple motors need to be driven to asynchronously and simultaneously realize a real-time work, for example, the control on different temperature and humidity in each weaving workshop of weaving industry; control on different flow and flow rate in each hydraulic power station; steel plate hoisting and splicing, component hole riveting, hull moving and overturning, weight float welding in shipbuilding industry; block hoisting of large-scale buildings and block erection of petrochemical equipment and other fields. Therefore, any circuitry or control method employed with well-known skills will be in the spirit of the invention. The characteristics of the invention will be defined by the appended claims and their equivalents.

What is claimed is:

1. A system for realizing rotor variable frequency speed control asynchronously and simultaneously by driving multiple motors via one inverter, comprises a motor group, rectifier group, chopper group, isolator group, amperite group, power capacitor group, inverter, speed feedback voltage detector and current feedback voltage detector, wherein:

the respective rotors of four motors $M_1$, $M_2$, $M_3$ and $M_4$ in said motor group are respectively connected to the respective corresponding input terminals of four rectifiers $Z_1$, $Z_2$, $Z_3$ and $Z_4$ in rectifier group in turn;

the respective cathodes E of four choppers $IGBT_1$, $IGBT_2$, $IGBT_3$ and $IGBT_4$ in said chopper group respectively intersect with the anodes of the respective corresponding three rectifier diodes of four rectifiers $Z_1$, $Z_2$, $Z_3$ and $Z_4$ in said rectifier group at one point, i.e., point D, in turn;

wherein:

said inverter is a full-bridge inverter, which comprises six silicon controlled invertors, i.e., $KP_1$, $KP_2$, $KP_3$, $KP_4$, $KP_5$, and $KP_6$, and the three connection points of the output terminals $KP_1$ and $KP_4$, $KP_2$ and $KP_5$, $KP_3$ and $KP_6$ are respectively connected to the ends A, B and C of a three-phase industrial AC power supply in turn, and then connected to the respective stators of the four motors $M_1$, $M_2$, $M_3$ and $M_4$ in said motor group.

2. The system for realizing rotor variable frequency speed control asynchronously and simultaneously by driving multiple motors via one inverter according to claim 1, wherein:
said isolator group comprises eight isolators, i.e., $D_1$, $D_2$, $D_3$, $D_4$, $D_5$, $D_6$, $D_7$, and $D_8$, wherein $D_1$ and $D_5$, $D_2$ and $D_6$, $D_3$ and $D_7$, $D_4$ and $D_8$ are respectively connected in series;
the respective anodes of isolators $D_1$, $D_2$, $D_3$ and $D_4$ are respectively connected to the output terminals of the respective corresponding resistors $R_1$, $R_2$, $R_3$ and $R_4$ and the anodes C of choppers $IGBT_1$, $IGBT_2$, $IGBT_3$ and $IGBT_4$, in turn; and
the cathodes of isolators $D_5$ and $D_6$ are simultaneously connected to the input terminal of current limiting inductor $L_7$ in said amperite group, while the cathodes of isolator $D_7$ and $D_8$ are simultaneously connected to the input terminal of current limiting inductor $L_8$ in said amperite group.

3. The system for realizing rotor variable frequency speed control asynchronously and simultaneously by driving multiple motors via one inverter according to claim 2, wherein:
the connection points of isolators $D_1$ and $D_5$, $D_2$ and $D_6$, $D_3$ and $D_7$, $D_4$ and $D_8$ connected in series in said isolator group are respectively connected to the respective one end of capacitors $C_{13}$, $C_{14}$, $C_{15}$ and $C_{16}$ in said power capacitor group in turn, and thus a T-shaped structure is formed.

4. The system for realizing rotor variable frequency speed control asynchronously and simultaneously by driving multiple motors via one inverter according to claim 1, wherein:
said power capacitor group comprises four capacitors, i.e., $C_{13}$, $C_{14}$, $C_{15}$ and $C_{16}$, and the respective other end thereof simultaneously intersects with the respective cathodes E of choppers $IGBT_1$, $IGBT_2$, $IGBT_3$ and $IGBT_4$ in said chopper group at one point, i.e., point D.

5. The system for realizing rotor variable frequency speed control asynchronously and simultaneously by driving multiple motors via one inverter according to claim 1, wherein:
said amperite group comprises two current limiting inductors, i.e., $L_7$ and $L_8$, and the output terminal of current limiting inductor $L_7$ is connected to the zero line end N of the three-phase industrial AC power supply, while the output terminal of current limiting inductor $L_8$ is connected to one end of inductors $L_4$, $L_5$ and $L_6$ at one point simultaneously.

6. A system for realizing rotor variable frequency speed control asynchronously and simultaneously by driving multiple motors via one inverter, comprises a motor group, rectifier group, chopper group, isolator group, amperite group, power capacitor group, inverter, speed feedback voltage detector and current feedback voltage detector, wherein:
the respective rotors of four motors $M_1$, $M_2$, $M_3$ and $M_4$ in said motor group are respectively connected to the respective corresponding input terminals of the four rectifiers $Z_1$, $Z_2$, $Z_3$ and $Z_4$ in said rectifier group in turn;
the respective cathodes E of the four choppers $IGBT_1$, $IGBT_2$, $IGBT_3$ and $IGBT_4$ in chopper group respectively intersect with the anodes of the respective corresponding three rectifier diodes of the four rectifiers $Z_1$, $Z_2$, $Z_3$ and $Z_4$ in said rectifier group at one point, i.e., point D, in turn;
wherein:
said inverter is a half-bridge inverter, which comprises three silicon controlled invertors, i.e., $KP_1$, $KP_2$ and $KP_3$, and via a circuit formed by connecting three fuses $FU_1$, $FU_2$ and $FU_3$ with three inductors $L_1$, $L_2$ and $L_3$ in series and then via the respective other end of three inductors $L_1$, $L_2$ and $L_3$, the respective cathodes thereof simultaneously intersect with the respective cathodes E of the four choppers $IGBT_1$, $IGBT_2$, $IGBT_3$ and $IGBT_4$ in chopper group and the respective other end of the four capacitors $C_{13}$, $C_{14}$, $C_{15}$ and $C_{16}$ in power capacitor group at one point, i.e., point D, in turn.

7. The system for realizing rotor variable frequency speed control asynchronously and simultaneously by driving multiple motors via one inverter according to claim 6, wherein:
said inverter is a half-bridge inverter, and the respective anodes of its three silicon controlled invertors $KP_1$, $KP_2$ and $KP_3$ are respectively connected to the ends A, B and C of a three-phase industrial AC power supply in turn, and then connected to the respective stators of the four motors $M_1$, $M_2$, $M_3$ and $M_4$ in motor group.

8. The system for realizing rotor variable frequency speed control asynchronously and simultaneously by driving multiple motors via one inverter according to claim 6, wherein:
the output terminal of current limiting inductor $L_7$ in said amperite group is connected to the zero line end N of an industrial AC power supply, and thus a three-phase zero-type active inversion bridge structure is formed.

* * * * *